Feb. 16, 1932. E. A. HATHAWAY 1,845,412
STUFFING MACHINE
Filed July 16, 1923 12 Sheets-Sheet 1
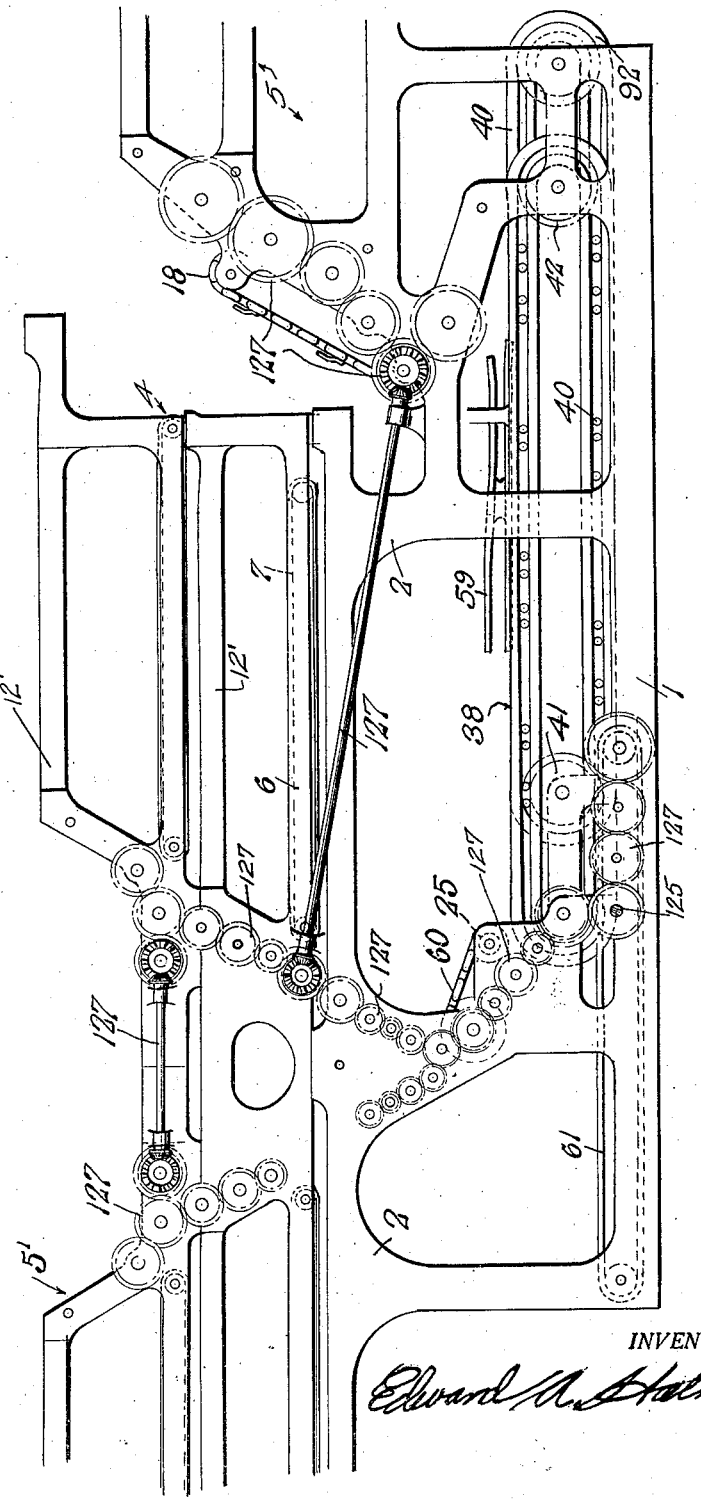
INVENTOR.
Edward A. Hathaway

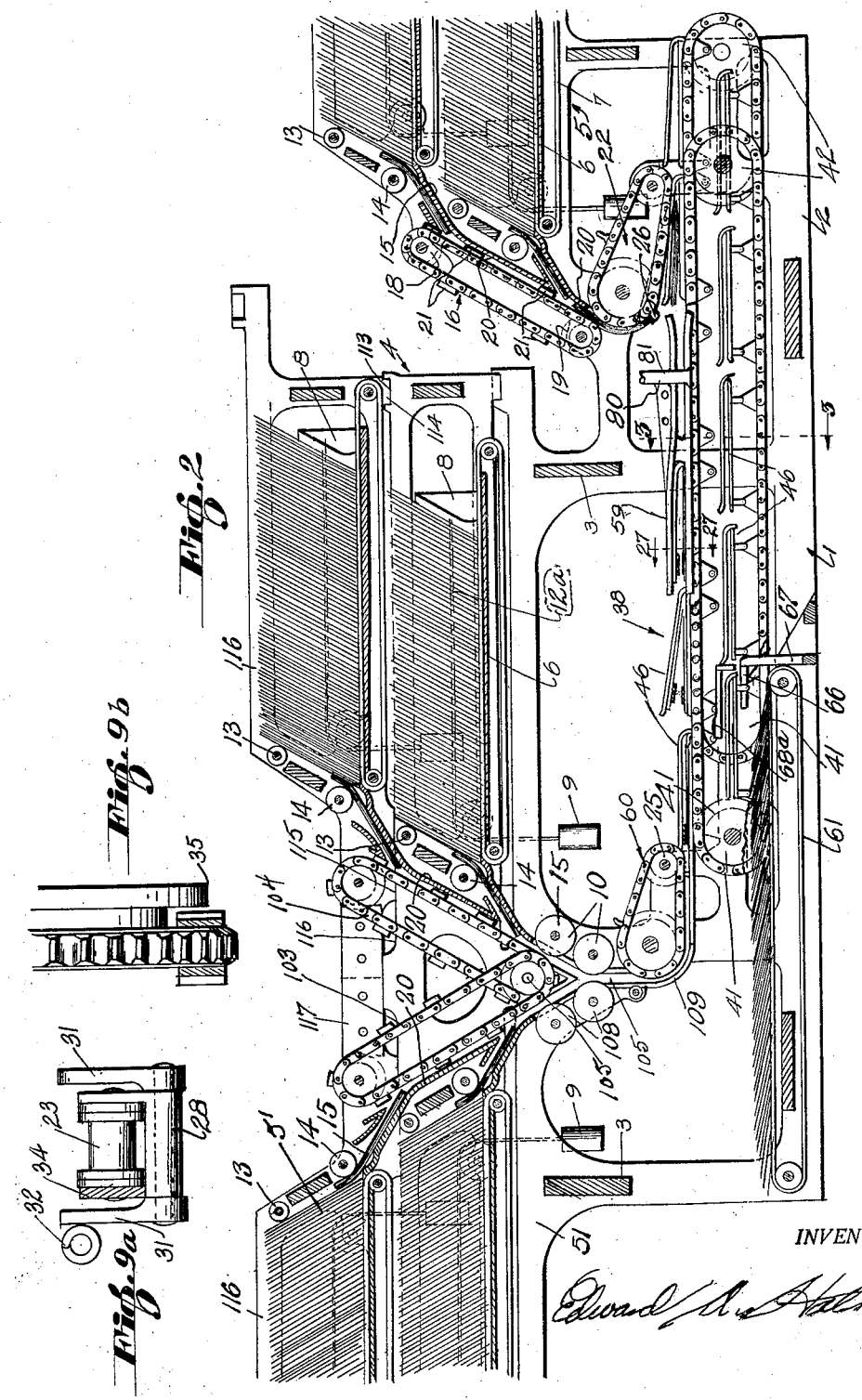

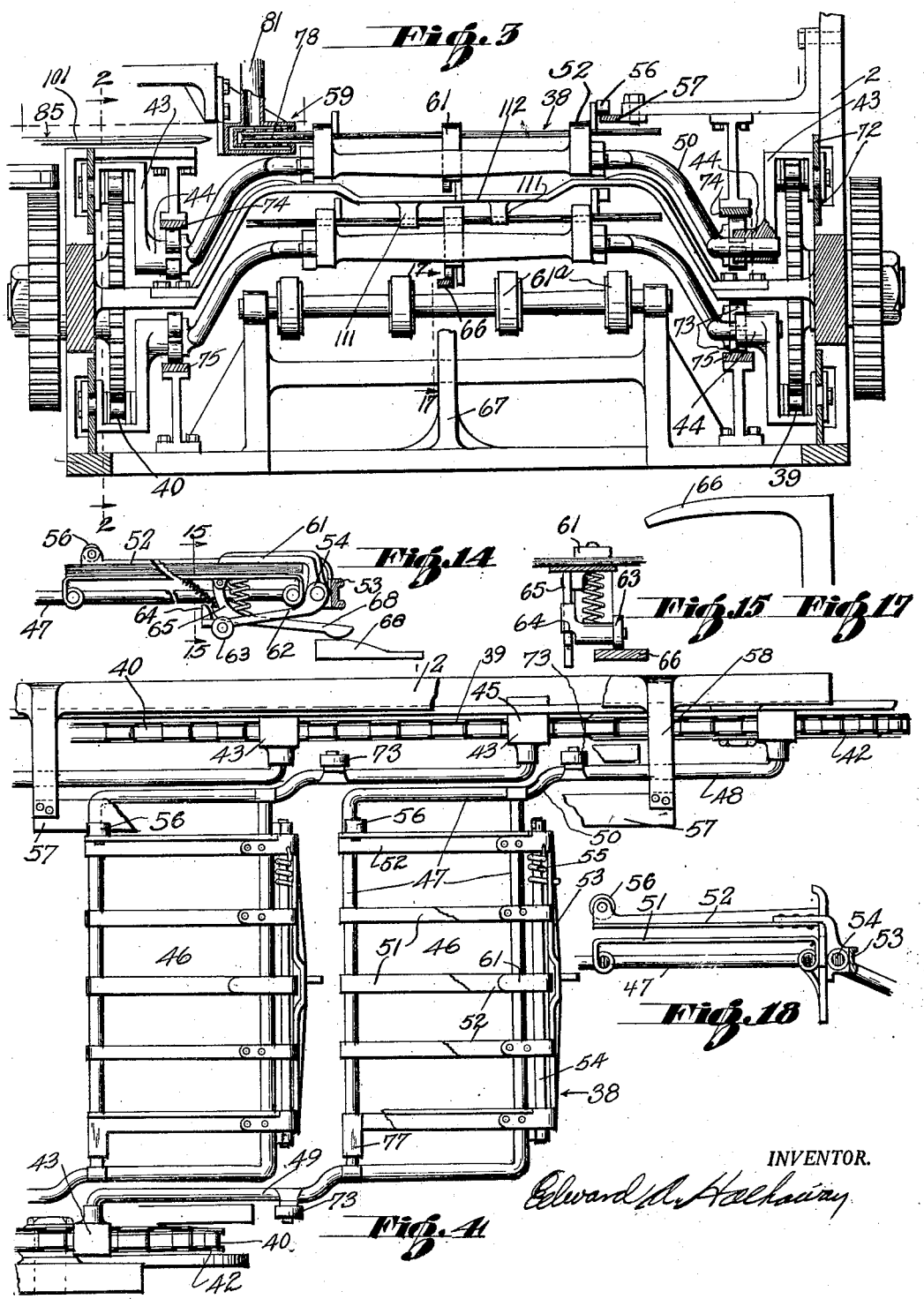

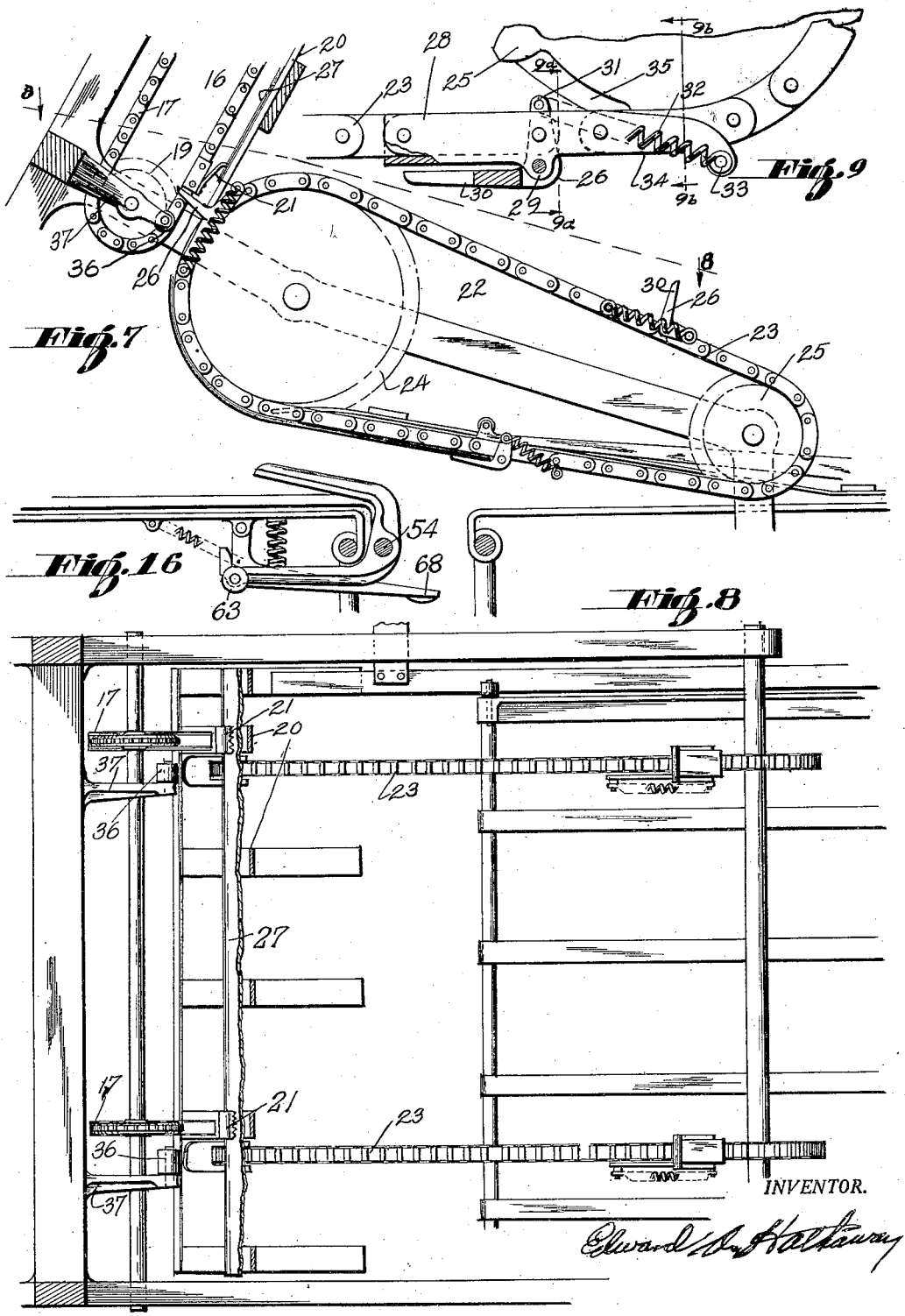

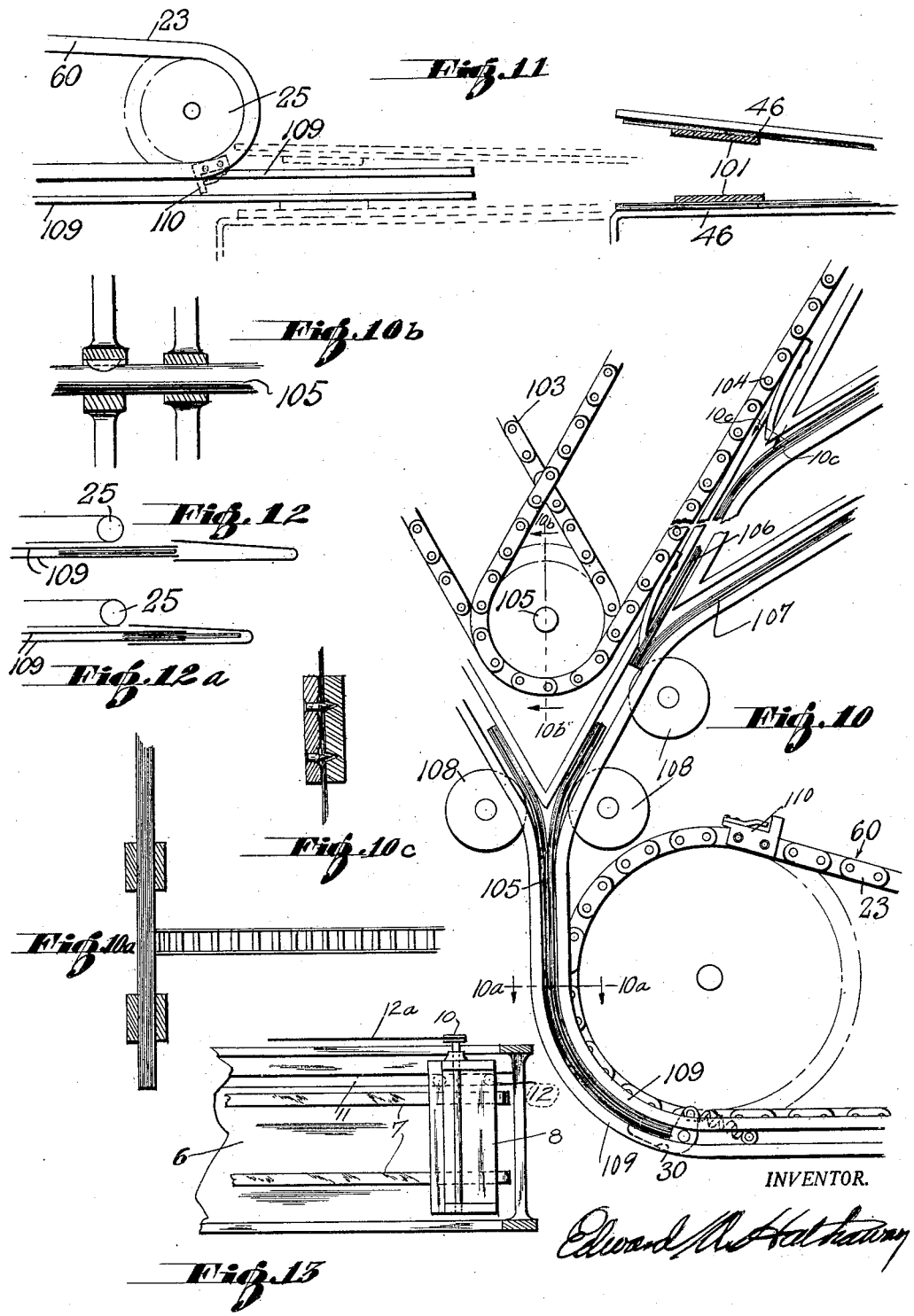

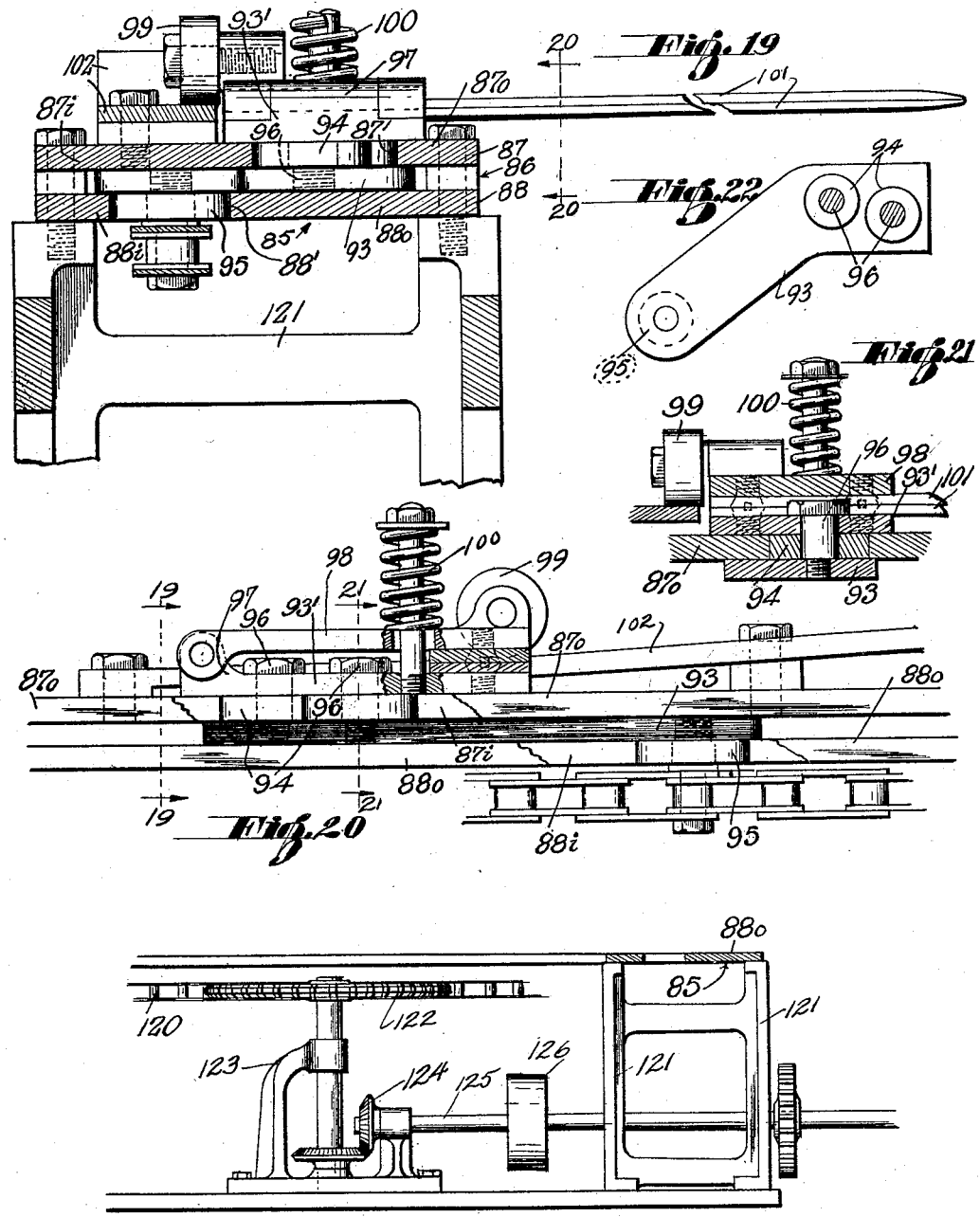

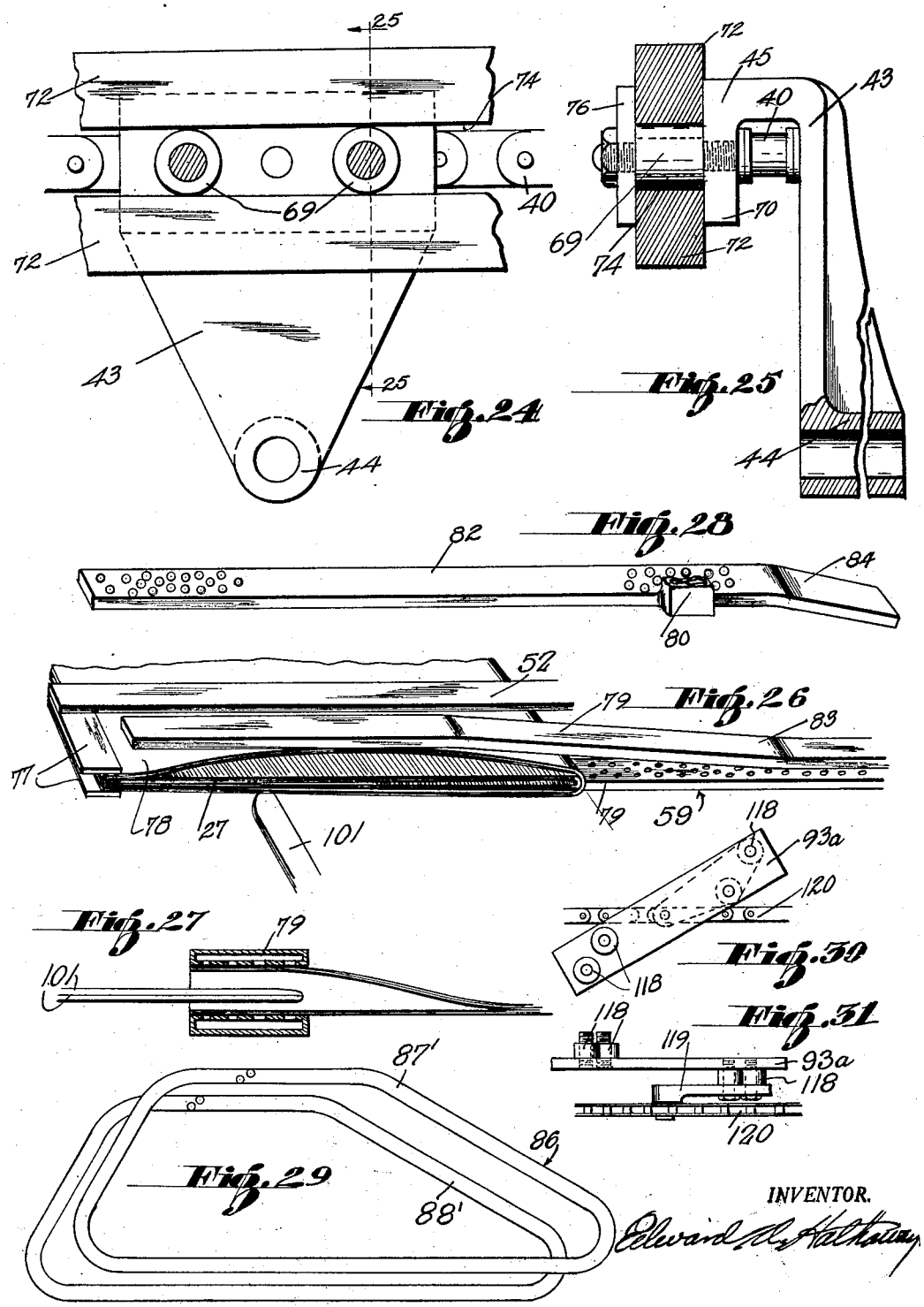

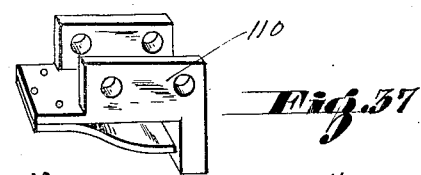
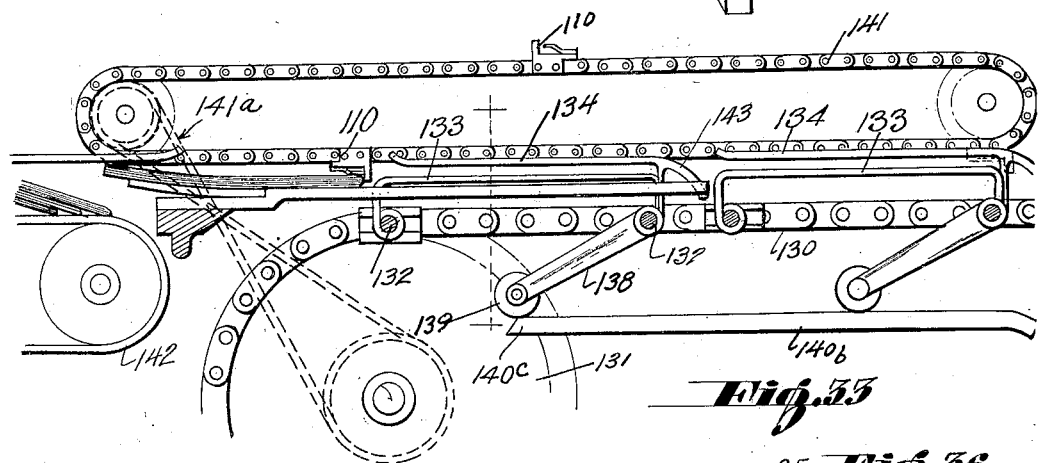
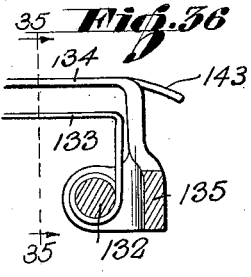
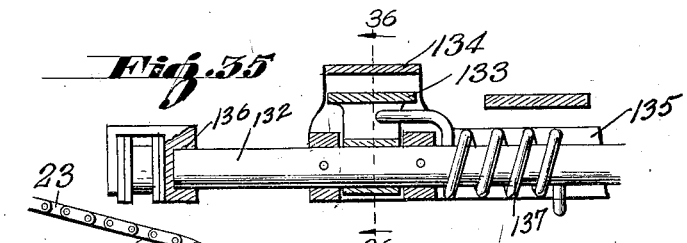
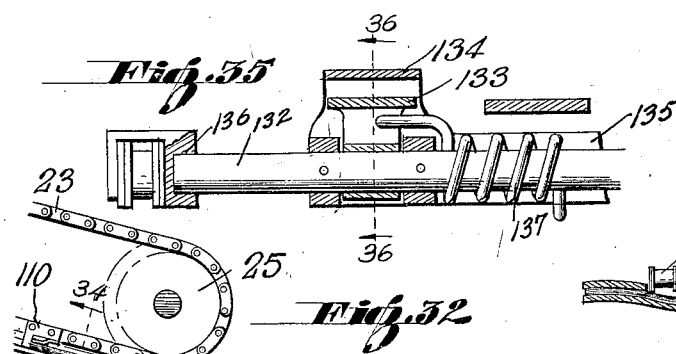
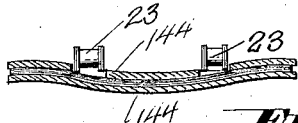
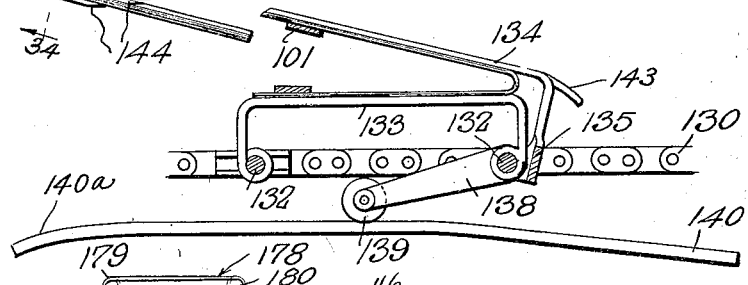
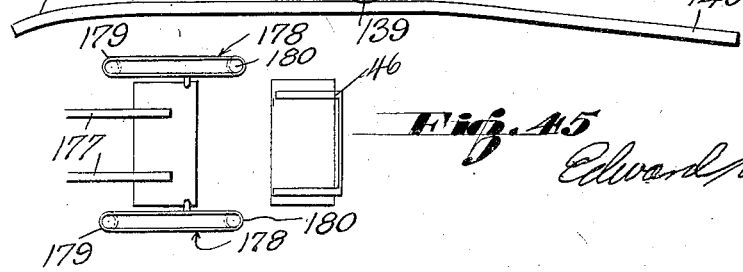

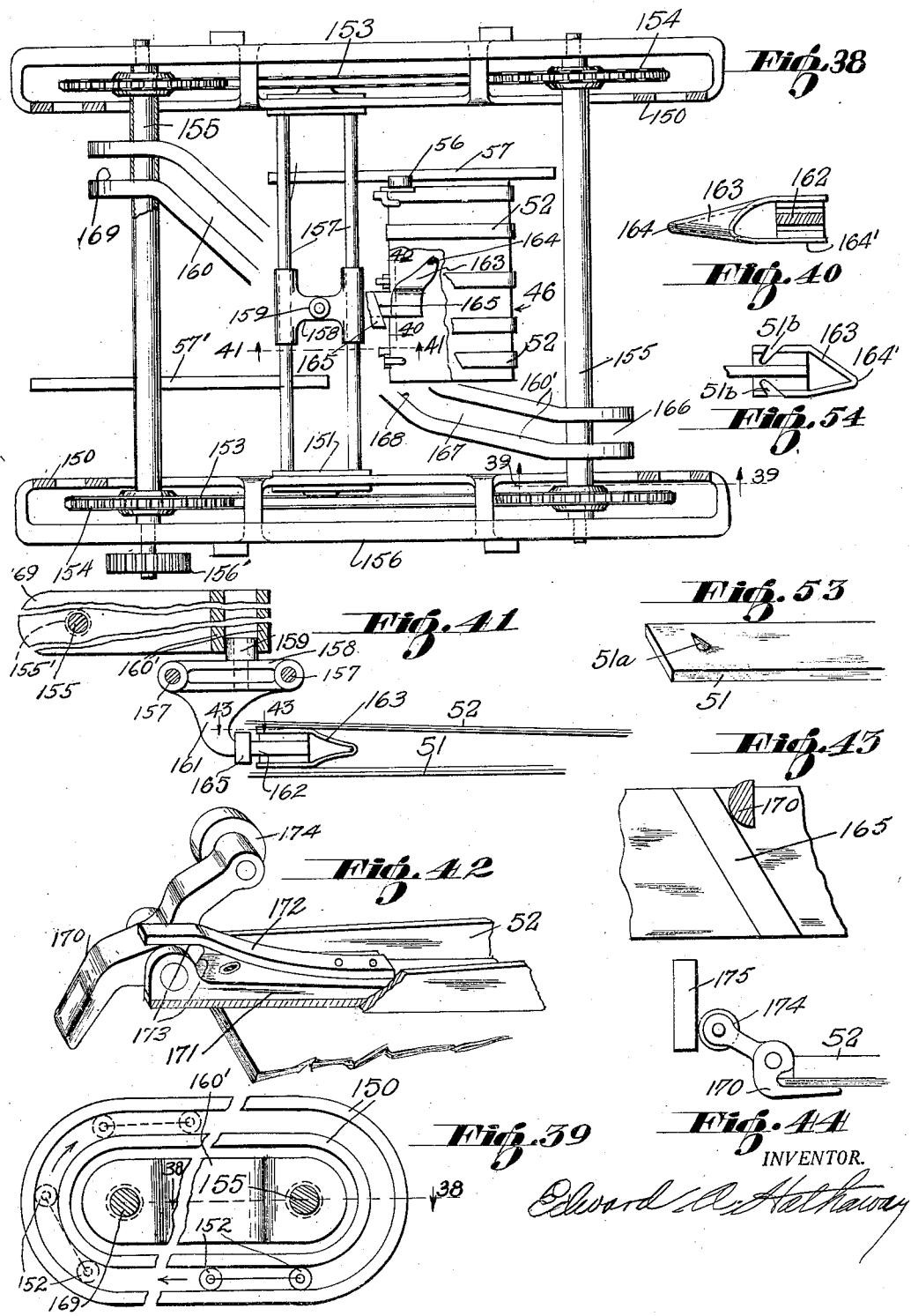

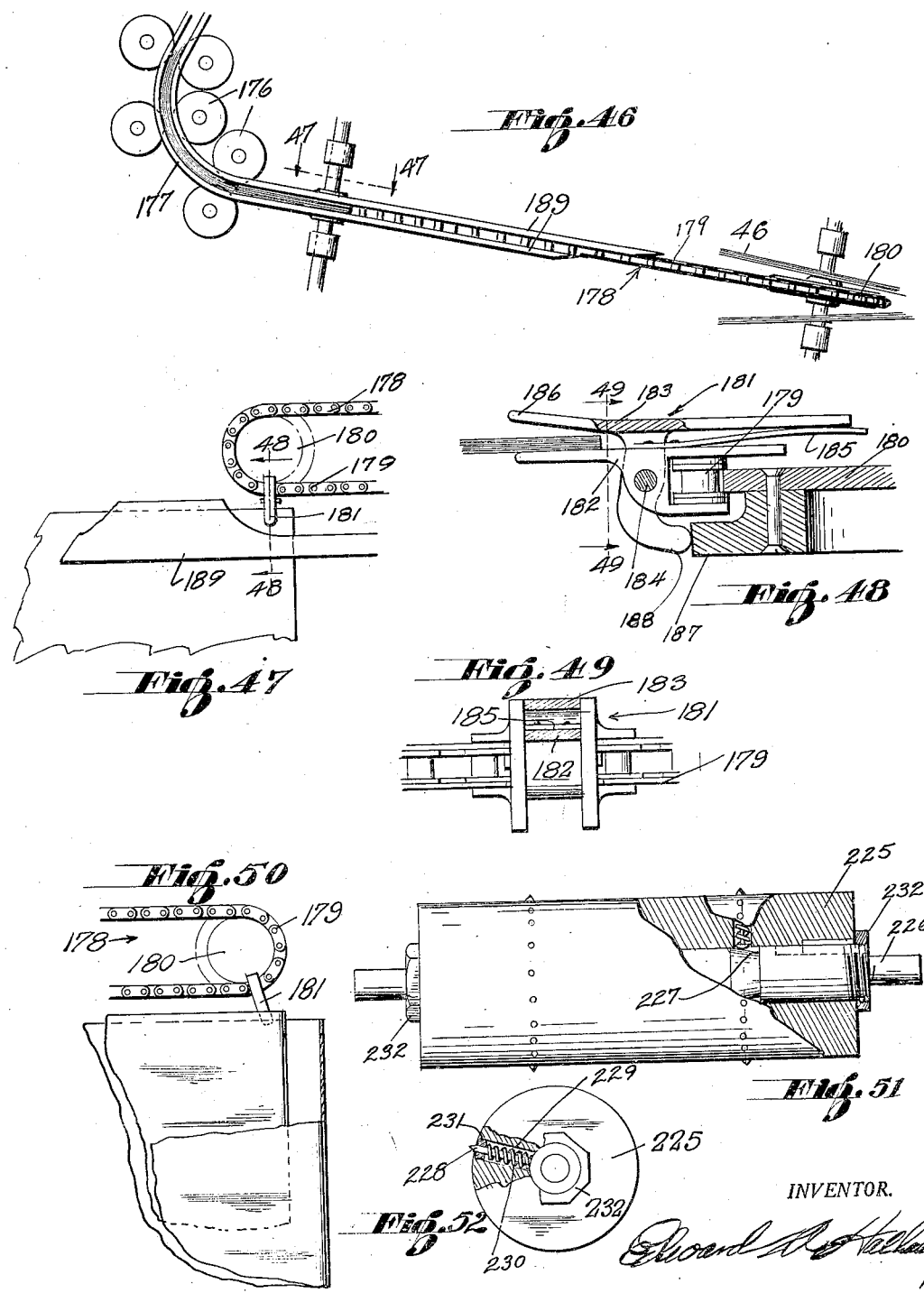

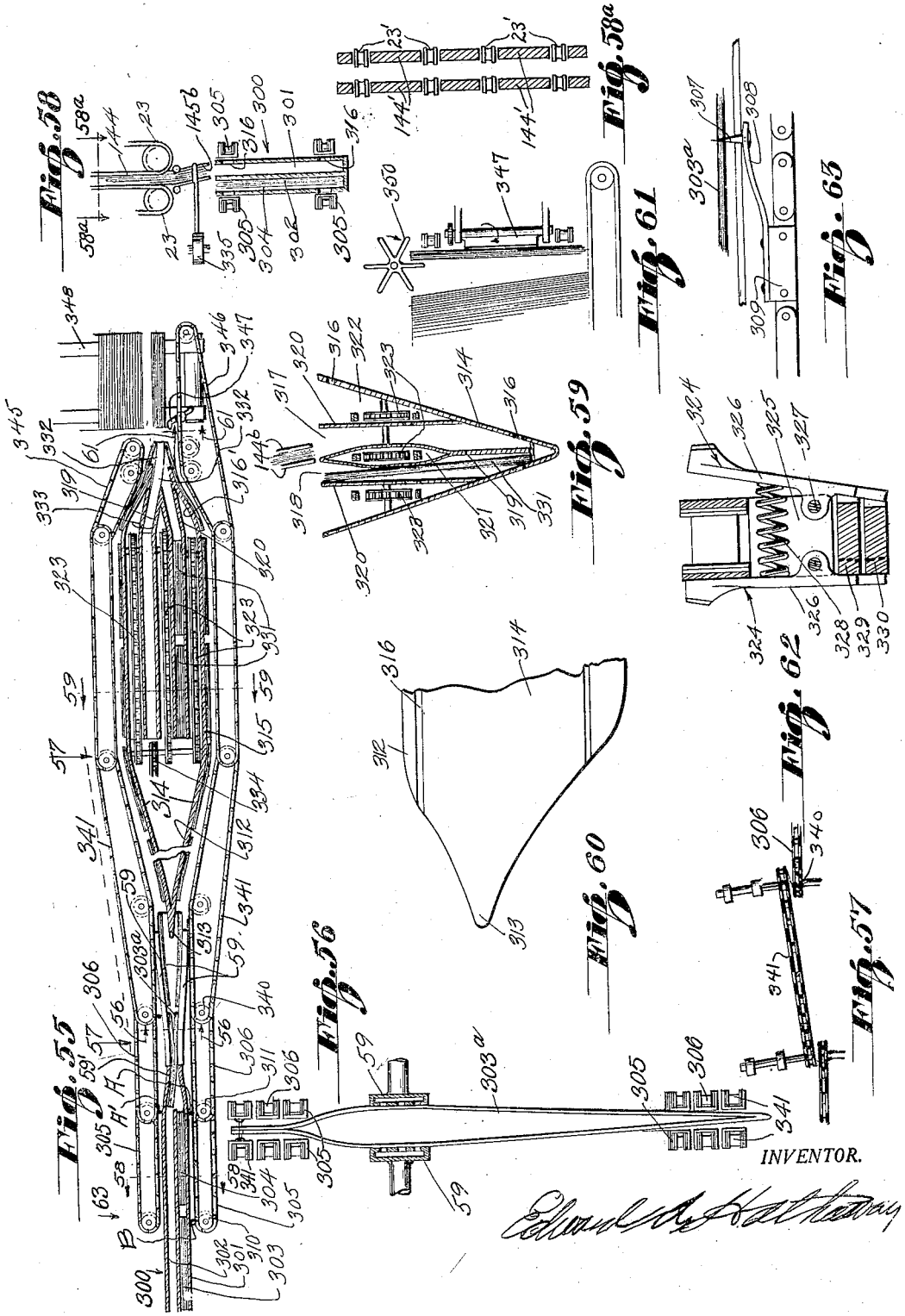

Patented Feb. 16, 1932

1,845,412

UNITED STATES PATENT OFFICE

EDWARD A. HATHAWAY, OF LOS ANGELES, CALIFORNIA

STUFFING MACHINE

Application filed July 16, 1923. Serial No. 651,989.

This invention relates to sheet associating means and more particularly to newspaper stuffing machines.

It has for its objects: to provide a machine having improved means whereby the cover section will be opened by vacuum means and then further opened by mechanical means; to provide an improved arrangement between said elements such that said cover can be continuously moved to its final point of discharge without any interruption; to provide improved means for positively feeding the paper through each of said means and to particularly pull it rather than push it; to provide improved feeding means for inserting the cover within gripping position for the last mentioned means, said cover feeding means being adapted to feed the individual papers at a rate slower than which they travel through the opening means, such a condition eliminating several undesirable features during feeding of thin papers; to provide a similar improved feeding means for the insertable sections; to provide an improved construction that will allow the papers to be fed through the opening means while spaced close together, at least within a space less than the shortest side of the paper; to provide improved means for feeding the inner sections both to suitable supporting racks and along with the cover section in which the same is inserted; to provide an improved feeding roller for feeding individual papers from their supporting racks; to provide improved means whereby the papers are positively fed into the supporting racks of the initial opening means and for inserting the inner sections within the opened section.

With the foregoing and other objects in view the invention consists of certain novel features of construction and an improved arrangement of parts and mode of operation thereof which will be more apparent from the following description of the several embodiments of the invention as set forth in the following specification and appended claims and as illustrated in the accompanying drawings, in which;

Fig. 1 is a side elevation with parts omitted for clearness;

Fig. 2 is a vertical sectional elevation taken substantially on the line 2—2 of Fig. 3 and showing certain parts broken away and others shown diagrammatically for simplicity.

Fig. 3 is a transverse section taken substantially on line 3—3 of Fig. 2 and including parts not shown in Fig. 2;

Fig. 4 is a fragmentary plan view of the associating carriage.

Fig. 7 is a fragmentary side elevation of the feeding means shown in the operation of inserting the outside section of a newspaper in a rack of the associating mechanism;

Fig. 8 is a section on line 8—8 of Fig. 7.

Fig. 9 is a fragmentary side elevation of the means for feeding papers to the horizontal carriers.

Figs. 9a and 9b show details of the conveyor mechanism.

Fig. 10 is a fragmentary side elevation of feeding means for associating as a unit several different sections of a newspaper preparatory to inserting within the outside section;

Fig. 10a is a transverse plan view on line 10a—10a of Fig. 10;

Fig. 10b is a fragmentary transverse view on line 10b—10b of Fig. 10;

Fig. 10c is a fragmentary transverse view on line 10c—10c of Fig. 10;

Fig. 11 is a fragmentary side elevation of the end of the means for feeding the unit within the outside section;

Figs. 12 and 12a are diagrammatic views showing the method of inserting the inner sections within the outside or cover section;

Fig. 13 is a fragmentary plan view of a rack for holding a quantity of papers, and showing means for pressing them forward to the feeding means;

Fig. 14 is a longitudinal vertical section of one of the associating carriage platforms showing the relation of parts after the unit has been inserted within the outer section;

Fig. 15 is a transverse section taken on line 15—15 of Fig. 14;

Fig. 16 is a fragmentary vertical section of one of the platforms showing the relation of the parts before the unit has been inserted in the outer section;

Fig. 17 is a fragmentary side elevation of a cam for opening a gripper carried on the platforms taken on line 17—17 of Fig. 3;

Fig. 18 is a modified form of a platform;

Fig. 19 is an end view of the secondary opening means taken on lines 19—19 of Figs. 5 and 20;

Fig. 20 is a side view taken on line 20—20 of Fig. 19;

Fig. 21 is a transverse view taken on line 21—21 of Fig. 20;

Fig. 22 is a plan view of the roller support of the opening member;

Fig. 23 is a transverse section taken on line 23—23 of Fig. 5 and showing the power shaft for the whole machine;

Fig. 24 is a side elevation of one of the brackets for holding one of the platforms;

Fig. 25 is a transverse section taken on line 25—25 of Fig. 24;

Fig. 26 is a perspective view showing the edge of the cover section initially opened;

Fig. 27 is a fragmentary transverse section showing the entrance of the secondary opening means on line 27—27 of Fig. 2;

Fig. 28 is a perspective of the lower member of the initial opening means;

Fig. 29 is a plan view of a modified form of track for the secondary opening means;

Fig. 30 is a plan view of the roller support for the secondary opening means to be used on the modified form of track;

Fig. 31 is a side elevation of the same;

Fig. 32 is a side view of the modified form of the associating carriage and method of inserting the sections within the outer section;

Fig. 33 is a side elevation of the modified carriage showing means for discharging the completely associated paper therefrom;

Fig. 34 is a transverse section on line 34—34 of Fig. 32;

Fig. 35 is taken on line 35—35 of Fig. 36;

Fig. 36 is taken on line 36—36 of Fig. 35;

Fig. 37 is a perspective of one of the feeding elements;

Fig. 38 is a fragmentary plan view of a modified form of the opening means taken on line 38—38 of Fig. 39, parts being omitted for clearness;

Fig. 39 is a fragmentary side elevation taken on line 39—39 of Fig. 38;

Fig. 40 is a vertical section taken on line 40—40 of Fig. 38;

Fig. 41 is taken on line 41—41 of Fig. 38;

Fig. 42 is a perspective of the means for holding the paper open when opened by the modified means;

Fig. 43 is a fragmentary sectional plan view taken on line 43—43 of Fig. 41;

Fig. 44 is a fragmentary diagrammatic view showing how the holding means in Fig. 42 is released from gripping position;

Fig. 45 is a diagrammatic plan view of feeding means for inserting sections within opened covers Fig. 46 is a diagrammatic side elevation of the feeding means;

Fig. 47 is taken on line 47—47 of Fig. 46;

Fig. 48 is taken on line 48—48 of Fig. 47;

Fig. 49 is taken on line 49—49 of Fig. 48;

Fig. 50 is a fragmentary plan view showing disengagement of the gripping finger of the feeding means shown in Figs. 45 to 49;

Fig. 51 is a side elevation of one of the feeding rolls;

Fig. 52 is an end elevation of the feeding roll partly broken away;

Fig. 53 is a perspective of a modified form of means for holding the forward edge of the opened or cover section when opened;

Fig. 54 is a modified form of wedge similar to Fig. 40 used with the form shown in Fig. 52;

Fig. 55 is a partial sectional plan view of a modified form of the entire machine, parts being omitted for clearness;

Fig. 56 is a fragmentary transverse section on line 56—56 of Fig. 55;

Fig. 57 is a fragmentary side elevation of one of the chains taken on line 57—57 of Fig. 55;

Fig. 58 is a transverse view on line 58—58 of Fig. 55;

Fig. 58a is a section on line 58a—58a of Fig. 58;

Fig. 59 is a transverse view on line 59—59 of Fig. 55;

Fig. 60 is a fragmentary side elevation of the modified form of secondary opening means;

Fig. 61 is a fragmentary transverse elevation on line 61—61 of Fig. 55;

Fig. 62 is a transverse view of one of the gripping means employed on the chains for inserting the inner sections;

Fig. 63 is a plan view of one of the feeding chains showing a needle which engages the papers and looking in the direction of arrow 63 in Fig. 55;

Fig. 64 is a modified view of the feeding means for positively feeding a paper.

Figure 5:
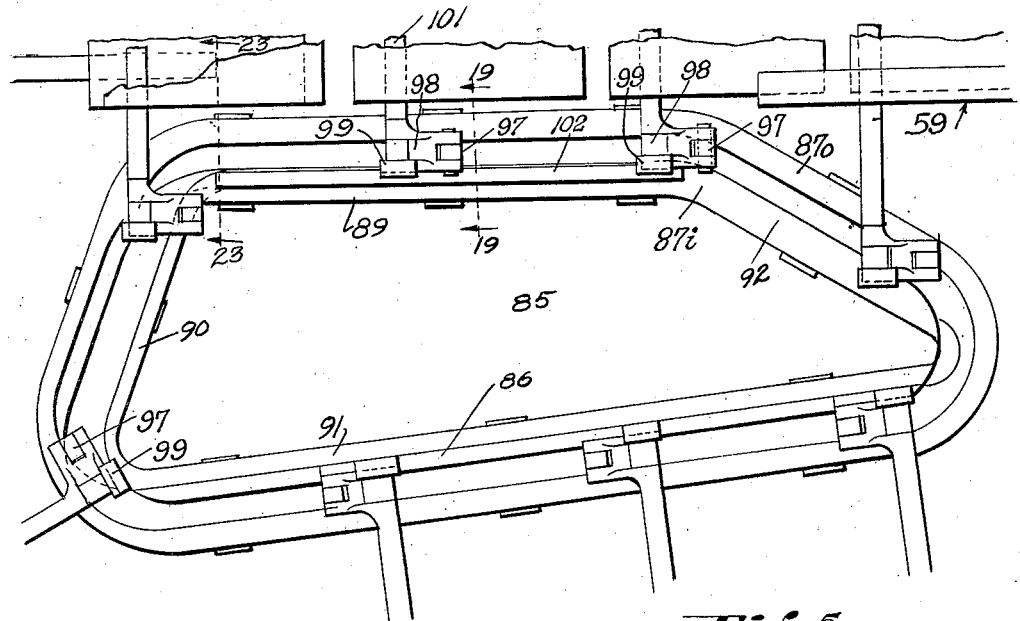
Fig. 5 is a plan view of the secondary opening means, parts being omitted for clearness.

Referring more particularly to the drawings, the machine as shown in Figs. 1 and 2 comprises substantially a lower frame 1 having side members 2 connected by any number of suitable cross members 3. The upper frame work 4 supports the racks for the different sections of newspapers or similar articles to be inserted within an outer section which are carried in supporting racks 5.

These racks which are substantially all alike include (Fig. 13) a base 6 and on the surface thereof are movable endless belts 7 upon which the papers rest to allow the same to be easily pushed forward to suitable individual feeding means by supports 8 adapted to engage the rear of the stack of papers as shown in Fig. 2. Constant pressure is exerted on the papers through weights 9 suitably secured at 10 to one side of supports 8. A groove 11 (Fig. 13) is formed in the base to receive rollers 12 mounted on the bottom of the supports 8 and which keep the latter from twisting out of line due to the side pull of the weights 9. This arrangement leaves one side of the frame work open to allow papers to be easily placed upon the rack in front of the supports 8 which can be readily moved back due to the flexible connection 12 with the weight and supports.

The papers are pushed forward until they engage upper rollers 13 and lower feed rollers 14, the latter being suitably driven so as to continually feed the papers down an incline 15 where they are engaged by feeding means 16. This means (Figs. 7 and 8) comprises a plurality of chains 17 mounted on upper and lower rotatable sprockets 18, 19 to allow the chain to travel parallel to guiding supports 20.

Inwardly projecting resilient gripping fingers 21 carried on the chains are spaced longitudinally thereof so that a paper from both the upper and lower racks 5 will be engaged and carried down the supports 20 simultaneously. This relative position of the grippers is diagrammatically shown in Fig. 2. This arrangement allows the papers to be fed by rollers 14 at one-half the speed that the chains 17 carry them at and yet permits very close positioning thereof while being carried by said chains. If three sets of racks were employed, the initial speed of the papers would be one-third and so on for the number used. As the lower sprockets 19 are approached the papers are fed substantially tangentially to horizontal or transverse feeding means 22. This latter means comprises a plurality of chains 23 mounted on forward and rearward rotatable sprockets 24, 25. To transfer the papers from the vertical to the horizontal feeding means suitable grippers 26 are spaced on the chains 23 so as to be in timed relation with grippers 21. Thus, as shown in Fig. 7, a gripper already in open position is shown slightly in advance of the end of the paper 27 about to be transferred.

The gripper 26 comprises a U-shaped member 28 mounted on the chain and having a bearing 29 at the rear end adapted to pivotally support a finger 30 which in gripping position lies parallel to the member 28 (Fig. 9). Projecting at right angles to and from the finger 30 and along both sides of the chain are portions 31. One end of a spring 32 is hooked to the outer end of one of these portions and the other end is fastened at 33 to a rearwardly extending arm 34 of member 28. The other portion 31 is adapted to engage a flange 35 mounted concentrically on the rear sprockets 25 which causes the finger 30 to be thrown out at right angles to the chain and retained in such a position due to the line of action of the spring being outwardly beyond the pivot point 29. As shown in Fig. 8, the chains 23 are to one side of the chains 17 and grippers 26 are so spaced that they are slightly ahead of the edge of paper 27. Upon further movement of the chain 23 from the sprockets 25 the end of fingers 26 engage rollers 36, suitably mounted on supports 37, causing the same to clamp a paper to chains 23 and carry the same along until the fingers 30 are disengaged by action of flanges 35 and portions 31 which allows the paper to be transferred to the associating carriage 38.

The purpose of this carriage is to carry the outside section, in a direction transversely to its long axis, through improved means for initially opening the folded short edge of the paper so that a final separating means may easily enter the opening between the outside pages of the paper and completely open the same preparatory to the insertion of the inner or insertable sections. Broadly this mechanism consists of a plurality of individual paper racks 46 (Figs. 2 and 4) each adapted to receive an individual paper from the feeder 22, carry them through an initial opening means 59, allow separating means to completely open them, and then carry the opened outside section up to the inserting means 60 which inserts the middle sections of the completed paper. The racks are now returned in a rearward direction beneath the upper forwardly moving racks. The completed paper is carried part of the way back during the return movement until pushed off onto a gathering belt 61a. The carriage mechanism (Fig. 4) comprises substantially two parallel chains 39, 40 run over front and rear sprockets 41, 42 suitably mounted on the sides 2. One of the chains is set in advance of the other, the purpose of which will hereinafter appear. Mounted on links of each chain and in staggered relation are vertically inwardly projecting supports 43 (Figs. 3, 4 and 25) each having a horizontally inwardly extending bearing 44 at the lower end and a recessed outwardly extending bracket 45 at the opposite end in which recesses the chains are fastened, as clearly shown in Fig. 25. The frame work of the individual paper racks 46 (Fig. 4) has rearwardly and forwardly extending arms 48 and 49 respectively, the ends thereof projecting outwardly at right angles thereto and journaled in the bearings 44. The ends of the transverse members of the rectangular portion are bent downwardly as shown at 50 in Fig. 3. Longitudinally mounted on portion 47 are fixed lower strip supports 51 and movable upper strip supports 52 overlying the lower strips. The upper strips are connected together by a member 53 which is pivotally mounted on a shaft 54 in turn mounted on the rear member of the rectangular portion 47. A spring 55 tends to keep said upper and lower strips together which are opened by a roller 56 carried on the front end of the outside upper strip and adapted to engage a longitudinal cam 57 supported on the frame 2 by arms 58.

Centrally mounted on the shaft 54 is a gripper 61 (Fig. 14) adapted to engage the completely associated newspaper upon return movement of the racks by pressing down on the upper surface of the newspaper until released. The means for operating the gripper comprises a forwardly extending spring pressed arm 62 having a roller 63 and a catch 64 at the free end thereof. A spring latch 65 pivotally supported on a lower strip will engage the latch when the arm 62 is pushed upward by a cam 66 supported by a base 67 located (Fig. 2) at the front of the carriage 38. Formed with and extending rearwardly from latch 65 is a tripping arm 68 adapted to engage cam 68a for releasing said latch to allow grippers 61 to engage the completed paper.

It will be seen that the racks 46 are carried forward, then down around the front sprockets, back over the rear sprockets and forward again during which movement the racks always are kept in a horizontal plane. To accomplish this only two chains are used and each rack is connected to each chain only through the supports 43 which are longitudinally spaced a considerable distance apart (Fig. 4) to prevent any undue teetering action. Thus it will be seen that as the chains travel around together the racks will always be kept in a horizontal plane. To keep the supports from moving relative to the chain two spaced rollers 69 (Figs. 24 and 25) are mounted on flange 70 of the supports 43 which run in a slot 74 formed by upper and lower guide members 72 that follow the complete path of the chain. A plate 76 holds the rollers and support in place on the guides. As shown in Fig. 3, the members 72 are located on the outside of each chain and suitably mounted on the side frame 2. To fully prevent any possible teetering action of the racks about the bearings 44 there is provided upper and lower rollers 73 on the arms 48, 49 which are positioned some distance back from the supports 43. The upper rollers engage upper tracks 74 upon forward movement and the lower rollers engage lower tracks 75 on return movement. Thus a four point support is maintained for the racks throughout longitudinal movement thereof.

Having described the construction of the associating carriage, further operation of the machine consists of slightly raising the upper strips 52 (Fig. 4) just before the feeding member 22 is reached by means of the roller 56 and a cam 57. This allows the outside paper to be carried between the upper and lower supports. When the rear edge of the paper reaches the rear edge of the rectangular rack-frame 46, the finger 31 (Fig. 9) will engage flange 35 and release the paper so that it may be carried forward by the rack which immediately closes by having the roller 56 drop off the cam 57. As shown in Figs. 4 and 26, one of the outside supports 51, 52, has opposed laterally extending portions 77 of relatively thin metal. When the papers are inserted in the racks one side projects over the outer strips 51, 52 as shown in Figs. 3 and 26 at 78. These lateral members engage the top open edge of the newspaper and hold it clamped while passing through the initial opening means 59. As is well known, newspapers are folded in quarters and thus have a closed bottom edge, a left hand closed edge formed of two closed edges one-half the thickness of the section of the paper, a right hand side edge exposing every sheet of paper in said section, and the top edge exposing the top and bottom edges of every sheet. If there are two or more sections together (Fig. 26) to form the outside section of the completed paper the operation will be the same as with a single section. The object at this point is to separate initially two of the closed side edges. This is done by passing said edges through the initial separator 59 which comprises vertically spaced upper and lower substantially parallel elongated hollow members 79 having perforated adjacent parallel flat faces 82. These members are connected by a hollow vertical portion 80 (Figs. 2 and 28) communicating with the hollow portions of members 79. A suitable conduit 81 extending from said portion 80 may be connected to any air exhaustion means (not shown). The lower member 79 is straight while the upper member curves upward starting at about 83 to form at the forward end a wider space between the members than at the rear end. The rear ends of the upper and lower members diverge as at 84 to allow easy entrance of the clamped side edge of the paper section into the small vertical space between the rear portion of members 79 and which causes the paper surface near the edge to come in contact with surfaces of the adjacent faces of the separator. By exhausting the air from the hollow portions the outer pages of the folded paper section will be forced against the two adjacent faces of the separator and as movement of the paper continues through the separator the two paper edges will be separated as shown in Fig. 26 due to the spreading of the members 79. During this operation the lateral members 77 prevent the front free edges of the paper from becoming torn due to contact with the edges of the perforations and also forms a means for directly pulling the edge of the paper through the separator rather than pulling from one side. That is, it will be seen that there is no tendency for the paper to be twisted as it passes through the separator and hence permits high speed operation.

Figure 6:
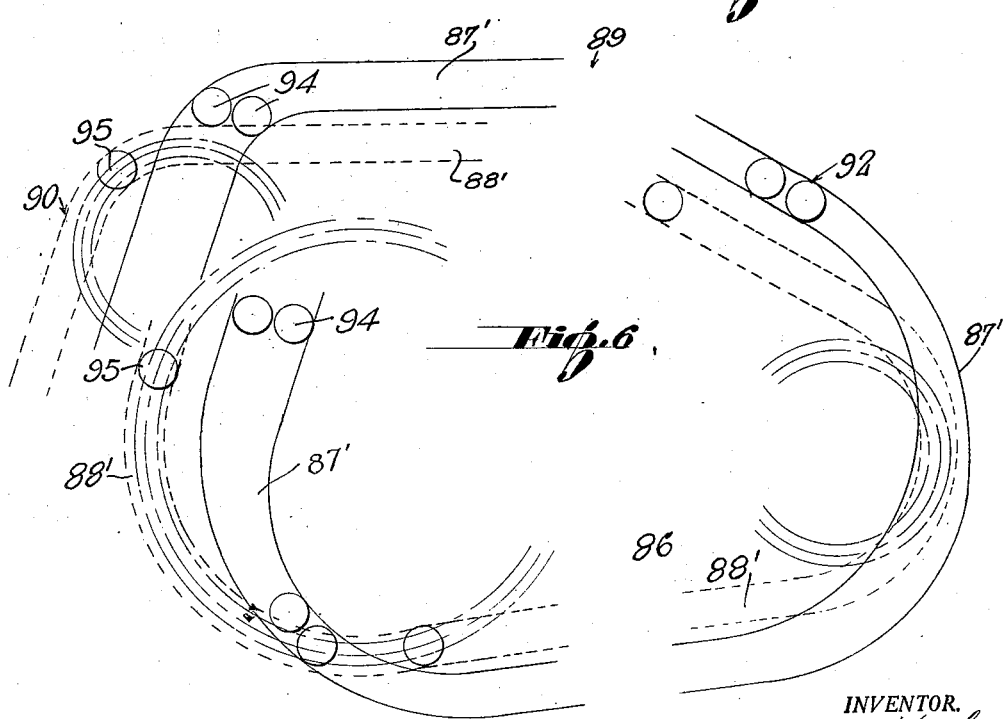
Fig. 6 is a diagrammatic plan view of different sections of the track upon which the secondary opening means operates.

As the paper reaches the forward end of the separator the side edges have been sufficiently opened to enable the final separating means, generally indicated at 85 (Fig. 5), to operate. The final separator comprises substantially guiding means 86 (Figs. 5 and 19) having vertically spaced upper and lower tracks 87 and 88 supported in a horizontal plane with side 89 thereof substantially parallel with the side of the associating carriage and the initial separator. From Figs. 5 and 19 it will be seen that the tracks 87 and 88 each comprise respectively horizontally spaced inner and outer tracks $87_o$ and $87^1$, and $88_o$ and $88_1$. From the forward end of the side 89 the track extends laterally as at 90, then rearwardly as at 91, and then inwardly at an angle as at 92. A plate 93 (Figs. 19 and 22) supports upper rear rollers 94 adapted to run in the groove 87′ formed by the upper tracks 87 and a lower forward roller 95 running in a lower groove 88′. It will be noticed in Figs. 5 and 6 that the grooves are positioned relative to each other and suitably shaped so that as the plate 93 travels along the sides 92, 89, and 90 it will be maintained in a longitudinal position and will only be turned when entering and leaving the side 86, the purpose of which will hereinafter appear. As shown in Fig. 19 the plate 93 runs between and bears against the upper and lower tracks. An upper plate 93′ riding on the upper surface of the upper track is connected to the plate 93 by bolts 96 which form the bearings for the rollers 94 and 95. A bearing lug 97 (Figs. 5 and 20) carried on the rear of the plate 94 pivotally supports a second plate 98 lying over the plate 93′ and carries a cam roller 99 on the forward inside edge. A spring 100 suitably supported by a bolt carried by the plate 93′ presses upon plate 98 normally to keep it down. Mounted on the forward end of plates 93′, 98 are laterally extending fingers 101. These fingers are adapted to spread relatively apart by the action of the roller 99 running on a cam 102 suitably supported on the upper track member $87_1$ of the side 89 (Figs. 6 and 19). As shown in Fig. 5 the fingers 101 traveling along the side 92 approach the opened edge of the paper, separated by the initial separator 59, substantially at right angles thereto. While entering the opening the fingers are together until the side 89 is reached in which position the fingers will extend within and completely across the paper. The fingers 101 travel along the side 89 at the same speed as the papers so that the cam 102 cooperating with the roller 99 will open the fingers and accordingly open the paper also. The fingers 101 hold the paper open until the side 90 has been reached (Fig. 5), when they begin to withdraw and close at the same time. During the period of withdrawing they keep their transverse position due to the construction of the track. However, when the side 86 is reached the fingers are turned to travel along side 91.

In the modified form of track shown in Fig. 29 the fingers always extend in the same direction while returning as they do in going forward. This eliminates the necessity of turning at the corners and accordingly any inertia effects at such points. To accomplish this the supporting plate $93_a$ (Figs. 30 and 31) has pairs of rollers on the upper and lower side of the forward and rear ends respectively. Mounted on the supporting pins for the lower rollers is a chain supporting plate 119 which extends to a mid-position between the two sets of rollers. This allows a chain 120 to pull equally on all rollers so that the finger support will not bind in rounding the curves.

Having opened the outside section of the newspaper, the mechanism for inserting the inside sections will now be described. The latter paper sections are mounted in racks 5′ substantially the same as the racks 5 and therefore will not be described beyond the novel frame which allows as many additions thereto as may be necessary. As shown in Fig. 2, each rack comprises a separate frame having recesses 113 on the rear thereof to receive feet 114 of the rack positioned above. At the forward end of the rack, feet 115 rest on a horizontal portion 116, the left and right hand racks being connected by a member 117. As more racks are used the chain feeding means 103, 104 are lengthened.

As shown in Figs. 19 and 23, the guide tracks 85 are supported on brackets 121 while the sprockets 122 are mounted on shafts rotatably carried by supports 123. There is a sprocket located at each curve of the track 85 and any one may be chosen for driving the chain 120 to which the several separating units 86 are attached. The particular driving means shown includes a set of bevel gears 124 operated by a drive shaft 125 having a driving pulley 126 thereon. This shaft extends transversely of the associating carriage as shown in Figs. 1 and 2 and is adapted to operate, through suitable gear trains 127, all the various rotating elements hereinbefore described. As the construction and use of gear trains is of such common knowledge and their adaptation to rotate mechanical elements so well known, further description of this feature is not thought to be necessary. The racks 4 and 5′ are provided with feeding means 103 and 104, similar to the feeding means 16, adapted to feed the papers from each of said racks and simultaneously place them together at a common junction 105 (Figs. 2 and 10). However, the lower sprockets are mounted on a common shaft 105 (Figs. 10 and 10b). The upper and lower racks of one side such as 4 may carry papers of the same section in which case the rollers feed the papers down at only one half the speed of the chains 103, 104, this operation being similar to the feeding of the papers from both racks 5 which carry identical sections. This eliminates several annoying features although each rack can be made to carry an entirely different section. As shown in Fig. 10, a paper 106 taken from the upper rack by chain 104 will be carried down to meet a different section 107. These are carried down together by feeding rollers 108 to the junction 105′ where they meet the papers from the left hand racks which then travel together. Feeding means 60 for carrying the several sections together from the junction 105′ is identical to the feeding means 22 and will not be described in detail. The gripping fingers 30 carry the combined sections between guides 109 which extend beyond the rear sprocket 25 (Fig. 11) approximately one-half the length of the short side of the paper. In order to move the papers within this extended portion, pushers 110, (Fig. 37) engage the rear edge of the papers and shove them forward. As shown in Fig. 12, when the sections to be inserted are wholly within the extended portions of the guides 109 the opened outside section has just reached the front edge of the guides. Both papers now advance one-half their length toward each other which brings the insertable section fully within the outer section as shown in Fig. 12a. The carrying rack 46 at this point has reached the forward limit of movement and now recedes by moving downward and backward due to the chains 40 passing over the front sprockets 41. However, the rack keeps its horizontal position as before described and is not moved downward the full diameter of the sprockets because the bearings 44 are located between the upper and lower chain strands. As shown in Fig. 24, the supports 43 cannot turn within the guides and hence when going around the curves at the sprocket ends the bearing 44 will go around in a radius smaller than the sprockets and in its lower returning position will extend upward. This enables the use of large sprockets while still maintaining sufficient clearance between the forwardly and rearwardly moving racks. Just before the rack reaches its position shown in Fig. 12a the gripping finger 61 is released from its position shown in Fig. 16 by the co-action of a lever 68a and a cam 68 (Fig. 14). Release of the finger 61 permits the outside and inserted sections to be gripped together and carried backwards to engage the discharging prongs 111 disposed in the path of the rearwardly moving sections and carried on a suitably mounted transverse support 112 (Fig. 3). When the prongs 111 engage the paper the finger 61 is again thrown in its position as shown in Fig. 16 by roller 63 and cam 66 (Figs. 2 and 14) to allow the paper to be discharged. The prongs extend down between the strip supports 51 to engage the rear edge of the paper and upon further backward movement of the racks the paper is pushed out onto the discharge belt 61a where they are taken off by hand.

The object of the modification shown in Figs. 32 and 36 is to provide the racks with a four point support and to follow the chains around the sprocket ends rather than remain horizontal. This construction comprises two parallel chains 130 mounted on sprockets 131. Transverse shafts 132 are connected to the chains which carry lower strip supports 133 fixed thereto. The front shaft 132 is slidably connected to the chains as shown at 132, Fig. 33, to prevent binding in going around the sprockets 131. The upper supporting strips 134 are fixed to a transverse member 135 fixed to the rear shaft 132 which is rotatably supported by the chain as at 136. A spring 137 surrounds shaft 132 and causes the upper and lower strips to be urged towards each other. An arm 138 carrying a roller 139 is adapted to raise and lower the strips 134 by riding upon cams 140 and 140b. The timing of this operation is the same as that described in the operation of the preceding form of carriage in that strips 134 are raised up by cam 140 when inserts are to be inserted within the cover section after which roller 139 passes off the end 140a and permits arms or strips 134 to rest upon and hold the complete paper together. Just prior to removing the paper the holding pressure of arms 134 is released by roller 139 riding up on cam 140b which is of sufficient length so that the pressure is relieved until after the paper is removed by chain 141 and pushers 110. The roller 139 then moves off the end 140c of the cam to permit the rack to pass around with chain 130. It is obvious as previously stated that all of the rotatably driven shafts may be connected or driven in timed relation in any manner such as is commonly employed in driving rotating shafts. For instance, chain 141 may be driven by a crossed chain and sprocket or belt diagrammatically shown at 14a. As the racks travel around with the chains, it will be seen that it is necessary to remove the assembled paper while the racks are still traveling forwardly. To accomplish this a removing chain 141 traveling faster than the racks has pushers 110 adapted to engage the rear edge of the papers as shown in Fig. 33 to push them out of the racks and onto a gathering belt 142. The rear end of the strips 134 have curved rearwardly extending portions 143 to allow the paper from the following rack to be easily ejected as the ejection of the paper must be started before the rack in advance has started around the sprockets.

The means for placing and opening the outside section in the traveling racks is the same as in the previous disclosures but the means for inserting the inner sections comprises transverse upper and lower transversely curved supports 144 with grooves in the upper support to allow feeding chains 23 to properly engage the papers. The supports 144 terminate at a point above the line of travel of the free end of the support 134 when in opened position as shown in Fig. 32. The inserted section is fed down from the free end of the supports 144 by a pusher 110 carried by a chain 23 which is identical to the chains of the feeding means 22 and 60, in fact, the fingers 30 are also used which will extend down through the opening in the top support, which allows the paper to be free of any forward support or the like which might interfere with the inserting operation. The portion of the paper projecting beyond the ends of the support 144 will be maintained substantially in a straight line due to its being transversely curved and also supported at its rear end by the curved supports 144. When the outside and inside sections have the positions shown in Fig. 32 and are then moved one-half their depth toward each other, they will be assembled, it not being thought that this half movement operation is the same as previously described in the other form. The completed paper will then be removed as above described.

A modified form of means for opening the outer section and means for positively feeding the inserted sections are shown in Figs. 38 to 50. In Fig. 38 is shown the usual rack 46 having its lower supporting strips fixed to usual side chains and the usual upper pivotally mounted supporting strips. The chains have been omitted for simplicity. In the present instance rollers 56 are mounted on both of the upper and outer supporting strips and adapted to successively engage side cams 57 and 57′, which as shown in Fig. 3 rise upwardly in the direction of movement of the rollers 56 thereby to cause fingers 52 and the upper side of the paper section to move upwardly. The modified means for opening the paper after the outer edges have been initially separated consists of two sets of parallel tracks 150 (Figs. 38, 39) adapted to guide movable supports 151 which have spaced rollers 152 disposed within the groove between the tracks 150. Endless chains 153 mounted on the sprockets 154 are connected to the outer sides of the supports 151. The sprockets 154 are fixed to rotatable shafts 155 mounted in any suitable frame-work 156 and to which the tracks 150 are connected. The shafts can be rotated by any suitable means as through a gear 156′ to cause the chain 153 to travel at the same speed as the associating carriages 46. Connected to the supports 151 are two transverse rods 157 upon which is mounted a slidable support 158 having a roller 159 mounted on the upper side thereof and adapted to run in a cam groove 160 formed by members 160′ supported on the shafts 155 by passing through bearing openings in the members 160′, Fig. 41. The members 160′ are held in spaced relation with respect to each other and to the sprockets 154 by spacing rings or tubes 155′. An arm 161 depends centrally from the support and has a rearwardly projecting arm 162 carrying on the end a laterally extending wedge shaped element 163 adapted to have its relatively thin and rounded nose 164 inserted between the opened edges of the outside section when the same is passing through the initial separating means 59. The opposite end of the wedge shaped element has a portion 164′ substantially equal to the distance to which the outside section is finally opened. A transverse cam 165 is also mounted on the arm 162 as shown in Fig. 43. As shown in Fig. 38, the support 158 will be on the lower side of the tracks 160′ and moving in the same direction as the rack 46, which in this figure is slightly displaced to the rear as is also the wedge 163 for the sake of clearness, but normally is positioned relative to support 158 as shown in Fig. 41. When the support 158 is at the beginning 166 of the cam groove 160, the nose 164 will lie along and be spaced laterally from the opened edge of the paper, which position is about the same as in Fig. 26. Thus continued movement of the support will, due to the angular part 167 of the cam, gradually cause the nose 164 to be inserted between the opened edges of the sections and this is accomplished just when the outside paper section is initially opened by the separator 59. The part 168 of the cam causes the wedge to traverse the newspaper and thus open it completely. When the straight part 169 of the cam is reached, the wedge is free of the paper and is returned by passing around the ends of the forward sprockets and back over the top of the cam 160, the support 158 changing its position back to the other side. As shown in Figs. 39 and 41 the cam 160 is of great enough depth to allow continued engagement thereof by roller 159 so that the support will be returned to its initial point. The cam 57 terminates just behind the straight portion 169 to allow the wedge to pass by the edge of the paper so the latter may continue on uninterrupted. Before the roller 56 rides off cam 57, the other roller 56 engages the cam 57′, thus holding the paper supports apart.

It will be understood that the number of wedges used will depend upon the length of the chains carrying the several traveling racks 46. This would also determine the angle of the cam groove 160 which would control the transverse rate of travel of the wedge. The longitudinal spacing of the wedges would depend upon the spacing of the racks 46 for, as is obvious, these two elements must always travel at the same rate. It is seen that when the wedge passes between the two halves of the paper some means must be provided for holding the same against the upper and lower opened supporting strips 51, 52. This means comprises fingers 170 pivotally supported on some of the forward ends of the supporting strips 51, 52 of the racks 46 and are successively actuated by the cam 165 which travels with the support 158 and extends from opposite sides thereof a sufficient distance to actuate all the fingers. The fingers 170 are pivotally mounted on brackets 171 suitably fixed to the upper and lower strips. A spring 172 retains the fingers in either open or closed position by engaging flat surfaces 173. As the wedge travels across the paper, the upper and lower fingers 170 are engaged by the slanting cam 165 as shown in Fig. 43 and thereby pushed rearwardly to grip the papers as shown in Fig. 44. When the wedge has completed its transverse movement, the opened paper is carried forward to receive the inserted sections, after which the fingers are released by having rollers 174 carried on upwardly extending arms of the fingers 170 engage suitably supported abutments 175 (Fig. 44). The paper can now be removed by any suitable means before described.

A positive means is shown in Figs. 45 to 50 for inserting an inner section within an outer one when the last described opening means is used. The papers are turned from the junction 105 to a substantially horizontal position by any suitable means, herein specifically shown as rollers 176, (Figs. 45 and 46) and guide strips 177 leading to feeding means 178 mounted on each side of the insertable sections. This means comprises endless chains 179 mounted on sprockets 180 and driven in any suitable manner. Grippers 181 comprise a lower member 182 fixed to a chain link and an upper member 183 having a finger 186 pivoted thereto as at 184. A spring 185 tends normally to press upper finger 186 toward the lower finger 182. As the gripper approaches the sprockets, a concentric flange 187 mounted on said sprocket and constituting a cam engages a projection 188 fixed to the lower part of the upper member 183 and causes the upper finger to be moved away from the lower one as shown in Fig. 48. When the gripper approaches the paper as shown in Fig. 47, the fingers are open and override the corner of the guide supports 189, which are a continuation of guides 177, to properly lie above and below the upper and lower sheets of the sections being inserted. As the grippers move forwardly the cams 187 are disengaged and the fingers then grip the front portion of the paper to carry it forward. Upon reaching the forward sprocket another cam 187 is engaged by the portions 188 to release the fingers, allowing the paper to go free. It is understood these operations are simultaneously the same on both sides of the paper until released. The supports 189 terminate above the end of the upper supporting strip of the rack 46 as shown in Fig. 46. Thus the insertable section is positively carried within the outside section and is not released until the position shown in Fig. 50 is reached. The completely stuffed paper is then removed in any of the manners above stated. It will be understood that the several different modifications of opening means, inserting means, and moving racks can be combined in many different ways to obtain the same result.

In Figs. 51 and 52 a novel form of feeding roller is shown which can be used in place of the rollers 14 (Fig. 2) and comprises a cylinder 225 keyed to a shaft 226. This shaft has annular recesses with inclined portions 227 which engage the inner ends of paper engaging prongs 228 for varying the distance the points project beyond the periphery of the cylinder and thereby enable feeding of papers of various thickness. Thus in feeding a section with only four sheets, a large projection would not be required. The prongs are slidably mounted in recesses 229 and are held therein by a spring 230 bearing against a flange of the inner end of said prongs at one end and against a plug 231 at the other end through which the prongs slide. Thus by adjusting nuts 232 the shaft slides relatively to the cylinder, thereby either forcing the prongs out or allowing them to be retracted.

In the modification shown in Figs. 55 to 63 the cover sections are fed vertically downward by such means as shown in Fig. 32 and, while in a vertical position, are carried laterally or in other words in the direction of the long axis of the paper through the initial and secondary opening means. As shown in Fig. 58, the papers are fed into a rack 300 by feeding chains 23' mounted on both sides of the paper to insure positive feeding. The chains carry pushers such as 110 and needles if necessary to carry the paper down between guides 144'. Guides 145b are pivoted to the lower ends of guides 144' thereby to guide the papers alternately to the two parallel racks 301, 302.

It will be noted in Fig. 55 that the parallel racks are each long enough to receive two papers placed end to end and in lengthwise position, the object of which will appear in the description of the operation. When two cover sections have been fed down simultaneously side by side into one of the racks 300, say 302, a cam 335 (driven by any suitable means so as to be in timed relation with the chains 23′) will then shift the pivoted lower portion of the guides 144′ so as to feed the closely following papers fed by the chains 23′ into the other rack 301 while the first papers are being removed in the following manner. The two cover sections when positioned in the first rack as indicated at 303 and 304 are then carried by horizontal chains 305 and 306 respectively having, as shown in Fig. 63, gripping needles 307 carried on resilient fingers 308 mounted on the chains by brackets 309. The chains 305 and 306 at the left end of Fig. 55 pass around sprockets 310 and 311 respectively which are mounted on suitable shafts and driven by any suitable means so as to be in timed relation with the placing of the papers 303 and 304 in their respective racks. These chains are duplicated on each side of the rack and also at the lower portion of the same as shown in Fig. 56. The chains 306 are twice as long as the paper while the chain 305 is four times as long or, in other words, the length of a double strand of the chain 306 is slightly greater than the length of a paper and is exactly equal to the distance between sprockets 311 and 340 while a double strand of chains 305 is twice as long as a paper length and in fact extends between sprockets 310 and 340. Chains 306 each carry one set of engaging needles, say at A, while the other chains 305 carry needles, say at B. As these chains travel at the same speed, it will be seen that the needles would project through slots 316 and simultaneously engage the top and bottom of the front end of each paper to pull the papers laterally off the racks 300 and at the same rate of speed. The needles carried by the chains 305 for this rack are displaced substantially two paper lengths apart from the needles carried on the chains 305 for rack 301, while the needles at position A on chain 306 which is one half the length of chain 305 will first engage the front portion of the right hand paper to feed the same forwardly the length of the paper and thereafter return in time to follow up the second paper. The follow up position is shown at A′ for the chain on the other side. While the needles on the short chain move around twice, the needles on the long chain move around only once because its chain is twice as long. Thus as the needles A are following up and returning for the second time while the needles B are returning for the first time, its respective rack will be left free during which time two things are occurring. First, more papers are adapted to be slowly fed into said rack and, secondly, while said papers are being so fed the papers which have been placed in the opposite rack will start to feed laterally so that the right hand paper will follow the left hand one of the first rack. This construction enables the individual paper covers to be fed relatively slowly to their respective racks 300. It of course is obvious that more or less papers could be fed without departing from the principle employed, such for instance as having one or three or more papers in each rack. By using the double rack the papers are allowed to follow each other closely through the remaining operations instead of having a space more or less the width or length of the paper, which would result if only a single rack were used. The needles are withdrawn when they reach sprockets 340. However, similar needles carried on chains 341 engage the papers to continue to carry the same forward at their initial rate of speed, thus making a continuous operation. As shown in Fig. 57, the upper strands of chains 341 decline from the sprockets 340 in order to allow the upper portion of the paper to spread out as it passes over the following mechanisms. The cover sections during their initial horizontal movement are guided by side 59′ to a position between the opposed suction members of the initial opening means 59 which is substantially the same as in the other construction first described. It is understood that papers travel with their folded edge forward so that when the intermediate portions of the two halves are separated as in Fig. 56, secondary opening means may be rendered operative. This secondary means 312 has a pointed portion 313 initially to enter the opening in the paper. This point diverges into a vertical and transversely V-shaped portion 314 (Figs. 55 and 59) which is substantially the same depth as the paper so as to completely open the same to allow other papers to be inserted therein. The portion 314 reaches its maximum width at 315 and extends for a distance equal to the length of two newspapers when the member then converges as shown at 316′. It will be noted that the sides of the rack 300 and secondary opening means 312 have slots 316 through which paper engaging needles may extend so as to properly engage the papers and feed the same. By the time the covers have been completely opened they will have reached the wide longitudinal straight V-portion 315. Disposed between the walls of the portion 315 are two channels 317, 318, forming racks to receive alternately two papers at a time placed endwise similar to the operation in connection with racks 300, the feeding mechanism 144b being identical to feeding mechanism 144′. These racks are formed by a central vertically disposed member 319 and two side members 320 extending not quite to the end of the portion 316′. The central member has a longitudinal opening 321 while there are spaces 322 left on each side of the members 320 within which are mounted longitudinally movable chains 323 carrying gripping members 324 to feed the insertable sections forwardly at the same rate of speed as the cover sections and in timed parallel relation thereto. These grippers comprise brackets 325 mounted on the chains and have arms 326 pivoted to the lower portion thereof as at 327. A spring 328 is adapted to engage these arms which are mounted on both sides of the chains, thus tending to force the same outwardly, through suitable longitudinally extending openings or slots 324' formed both in the walls 320 and the spaced side members forming chamber 321, these slots being disposed opposite the lower strand of the chains 323 as shown in Fig. 59 to grip the paper but are however prevented at certain times from doing so by cams 330 and 329. On each side of the central chain are several of these fingers longitudinally spaced thereon so that some will engage the right hand papers and others the left hand ones. For instance, the cam 329 will let one finger move out to engage the left hand papers and the cam 330 will simultaneously let the other finger move out to engage the right hand papers. The two cams are used because the forward finger must move longitudinally without lateral movement over the portion of the cam 329 which allows the finger to engage the left hand paper. As the fingers reach the forward sprockets over which they run, the cam will force the fingers back against the chains to release the papers. When the papers 331 are so fed forward they will be guided to the center as in the position shown where the paper 332 now is. By the time the fingers 326 have been withdrawn the papers have been fed far enough forward so that outer chains 345, 346 will press together the front edges of all the sections and thus continue the forward movement thereof. The chains 323 in channels 322 operate in the same manner as the central chain in chamber 321 and will of course have gripping elements on only the inner side thereof so as to cooperate with the gripping elements on the central chain to feed the papers. The gripping element 324 carried on the chain in the right-hand chamber 322, as viewed in Fig. 59, moves inwardly in a left-hand direction while the corresponding element 324 on the chain in the right-hand chamber moves inwardly in a right-hand direction. The right-hand chamber would thus have use for only the cam 329 while the left-hand chamber would involve only the cam 330. The cover and inner sections are so timed that they will be matched when reaching said junction. The upper strands of chains 345, 346 are inclined upwardly to make up for the converging guides. The chains 346 extend over the gathering belt 348 in order to positively feed the paper thereon.

In order that the papers may be continually fed onto the belt while substantially close to each other, suitable means are provided for instantly laterally displacing the left hand edge so that the following paper will be able to pass directly on to the belt. This means comprises a vertically rotatable member 347 which is suitably timed and actuated so that it will not interfere with the forward edge of the following paper, but will engage the trailing edge of the paper to be transversely displaced. Suitably actuated means 350 are provided for guiding the top edge of the paper and such means consists of several radially extending rotatable fins which prevent the loose upper tops from flying apart and will also displace the same in the direction of the arrows. In the several views of this modified form it will be understood that any suitable means may be used for actuating and supporting the several elements in timed relation. Such constructions require only ordinary mechanical skill and so are not shown which omissions permit clearly showing only the invention. It will be understood that the feeding chains, as shown throughout, are set back from the sides of the racks, etc. only to clearly set out their relative positions and that when set in the spring fingers 308 will easily take care of any variations in distance of paper from the chain.

What I claim as new and desire to secure by Letters Patent is:

1. In combination, means for opening a newspaper outside of the cover, and feeding means positively engaging the cover during opening thereof and at a point in advance of its trailing end.

2. In combination, means for opening a newspaper cover including vacuum means, and feeding means positively engaging the cover during opening thereof and at a point in advance of its trailing end.

3. In combination, means for opening a newspaper cover including vacuum means for initially and partially opening the cover sides and mechanical means insertable within the opened cover to effect further opening thereof, and feeding means positively engaging the cover at a point in advance of its trailing end.

4. In combination, means for opening a newspaper cover including vacuum means for initially partially opening the cover and other means for further opening the same, and feeding means positively engaging the cover at a point in advance of its trailing end during opening of the cover.

5. In combination, means for opening a newspaper cover including vacuum means for partially and initially opening the cover and mechanical means for only subsequently completing the opening operation, and means for feeding the cover thereto.

6. In combination, means for opening a newspaper cover including vacuum and mechanical means, and means for feeding the cover thereto and uninterruptedly through one of said opening means during opening operation thereof.

7. In combination, means for opening a newspaper cover including vacuum and mechanical means, and means for feeding the cover thereto and uninterruptedly through both of said opening means during opening operation thereof.

8. In combination, means for opening a newspaper cover, and feeding means for pulling a portion of the cover through said opening means during opening operation thereof.

9. In combination, means for opening a newspaper cover, and feeding means for laterally pulling a portion of the cover through said means.

10. In combination, means for opening a newspaper cover, and feeding means for transversely pulling a portion of the cover through said means in a direction which an open side of the cover faces.

11. Mechanism for opening a newspaper section comprising means for pulling only a portion of the opposite sides apart to form an opening therein, and means insertable therein for maintaining and enlarging said opening.

12. Mechanism for opening a newspaper section comprising means for pulling only a portion of the opposite sides apart to form an opening therein, means insertable therein for maintaining and enlarging said opening, and means for feeding said section during said operation.

13. Mechanism for opening a newspaper section comprising means for pulling the opposite sides apart to form an opening therein, means insertible therein for maintaining said opening, and means for laterally feeding said section during said operation.

14. Mechanism for opening a newspaper section comprising means for pulling the opposite sides apart to form an opening therein, means insertable therein for maintaining said opening, and means for transversely feeding said section during said opening operation.

15. Mechanism for opening a newspaper section comprising means for pulling on each of the opposite sides to separate the same to form an opening therein, and means insertable therein and movable relative thereto for maintaining said opening.

16. Mechanism for opening a newspaper section comprising means for pulling on each of the opposite sides to separate the same to form an opening therein, and means insertable therein and movable relative thereto for maintaining said opening and to permit another section to be inserted therein.

17. Mechanism for opening a newspaper section comprising means for pulling on each of the opposite sides to separate the same to form an opening therein, and means insertable therein and movable therewith for maintaining said opening.

18. In combination, mechanism for feeding papers laterally in end to end relation, and means whereby the same are positioned in close relation.

19. In combination, mechanism for feeding papers transversely with the papers lying flatwise in substantially the same plane, and means whereby the same are positioned in close relation.

20. In combination, newspaper section opening means, and a plurality of means for feeding sections alternately thereto in end to end relation.

21. In combination, newspaper section opening means, and a plurality of means for feeding sections alternately thereto in one direction and in end to end relation to each other, and means for taking the same therefrom in another direction.

22. In combination, newspaper section opening means, and a plurality of means for feeding sections alternately thereto in one plane and in end to end relation and for removing the same therefrom in substantially the same plane.

23. In combination, means for opening a paper while traveling in a vertical plane, said means including elements having portions directly engaging the sides of the paper to pull the same apart, said portions being fixed during opening operation.

24. In combination, means for opening a paper while traveling in a horizontal plane including separable fingers insertable within the opening from the side of the paper.

25. In a newspaper-stuffing machine, an opener blade having a flat thin entering edge and an upwardly inclined portion into which the entering edge merges.

26. In a newspaper-stuffing machine, the combination of means for feeding folded sections to and past an assembling point, means for opening the sections successively as they travel to the assembling point, and means at the assembling point for inserting a section between the sides of the opened section.

27. In a newspaper-stuffing machine, the combination of means for feeding folded sections to and past an assembling point, means for opening the sections successively as they travel to the assembling point, and means at the assembling point for inserting a section between the sides of the opened section, and means beyond the assembling point for closing the opened section about the inserted section.

28. In a newspaper-stuffing machine, the combination of means for supporting a folded newspaper section on its side, means for lifting the upper leaf of the section to open the section, means for removing the opened section to a point of discharge, and means for inserting another section between the leaves of the opened section as the latter travels to the point of discharge.

29. The combination in a newspaper stuffing machine comprising means to separate the sides of a cover section at a point on the short edge of the paper and intermediate the normally top and bottom edges of the paper, means for engaging the paper whereby the top and bottom edges thereof remain closed for a predetermined movement of the paper thereby providing an opening in the short edge, and opening means adapted, upon relative movement between the same and the paper, to enter said opening and effect complete separation of the paper in both directions from said opening along the short edge.

30. The combination as set forth in claim 29 further characterized by having said opening means being of wedge shape formation in the plane of the paper.

31. The combination as set forth in claim 29 further characterized by having said opening means being of wedge shape formation in the plane of the paper, and feeding means for positively engaging the cover at its leading edge so as to pull the cover over said wedge, and means whereby said feeding means moves apart with the sides of said cover when said cover passes over said wedge.

32. The combination in a newspaper stuffing machine comprising means for effecting separation of the sides of a paper at a point on the short edge of the paper and intermediate the normally top and bottom edges of the paper, means for engaging the paper whereby the top and bottom edges thereof remains closed for a predetermined movement of the paper thereby providing an opening in the short edge, means for entering said opening to completely open said paper, and feeding means for said paper, including said engaging means, adapted to be in positive engagement with said paper near its leading short edge and near the top and bottom of the paper while the paper is traveling in the direction of its long edge.

33. The combination in a newspaper stuffing machine comprising means for feeding papers in one direction and then in the direction lengthwise of their long edge, and means whereby said papers are adapted to be successively positioned during the latter movement so as to be spaced apart a distance less than the length of the paper.

34. The combination in a newspaper stuffing machine comprising means for opening a cover section, means for feeding inserts from a plurality of sources to a common point and having the inserts fed in such timed relation that they overlap each other, and means whereby all of the inserts are fed simultaneously as a group into the opened cover whereby the paper is completely stuffed at one time.

35. In combination, means for opening a newspaper cover, and means positively engaging the cover at a point in advance of its trailing end after opening of the cover to feed the same in a direction toward which an open side of the cover faces.

36. The combination set forth in claim 35 further characterized in that said feeding means has provision for engaging the outer sides of the cover before as well as after the opening operation.

37. In combination, means engageable with the sides of the paper near its leading edge for feeding the papers lengthwise in the direction of its longest folded edge, means for separating a portion of the paper to provide an opening adjacent its leading edge while the feeding means remains in engagement therewith to pull the paper near its leading edge, and means adopted upon continued lengthwise feeding of the partially open paper to be insertable in the opening of the paper and effect further opening of the cover.

EDWARD A. HATHAWAY.